Sept. 14, 1926.
J. A. DYSON
1,599,879
MECHANICALLY OPERATED STANDING VALVE FOR OIL WELL PUMPS
Filed May 14, 1924
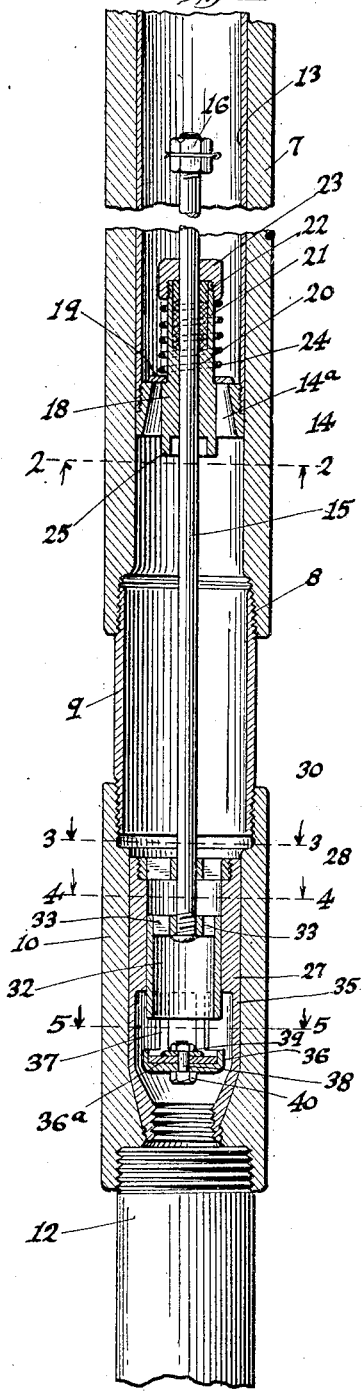
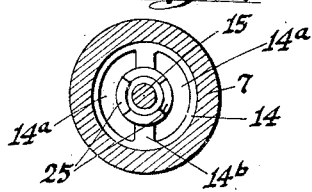
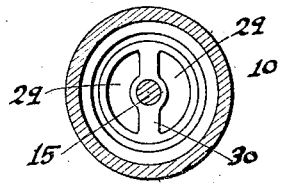
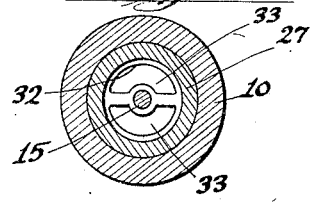
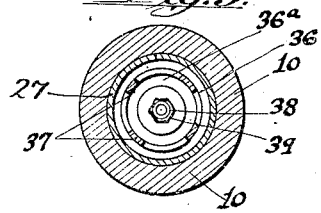
Inventor:
John A Dyson
By Hazard and Miller
Attorneys.
Witness:
Wm Hall.

Patented Sept. 14, 1926.

1,599,879

UNITED STATES PATENT OFFICE.

JOHN A. DYSON, OF LOS ANGELES, CALIFORNIA.

MECHANICALLY-OPERATED STANDING VALVE FOR OIL-WELL PUMPS.

Application filed May 14, 1924. Serial No. 713,207.

This invention relates to pumps and more particularly it relates to pumps for wells.

An object of this invention is the provision of an improved pump for oil wells in which a comparatively high gas pressure is encountered.

Another object of this invention is the provision in a well pump of a standing valve operable in a well having a comparatively high gas pressure.

A further object of this invention is the provision of a mechanically operated standing valve.

A still further object of this invention is the provision of improved means for withdrawing a standing valve from a well.

With the foregoing objects in view, together with such other objects and advantages as may subsequently appear, this invention consists in the construction and arrangement of parts hereinafter described and claimed and illustrated in the accompanying drawings, in which:

Figure 1 is a longitudinal section of my improved device in combination with the associated parts, Fig. 2 is a section taken on the line 2—2 of Fig. 1, Fig. 3 is a section taken on the line 3—3 of Fig. 1, Fig. 4 is a section taken on the line 4—4 of Fig. 1, and Fig. 5 is a section taken on the line 5—5 of Fig. 1.

Referring to the drawings for a more detailed description thereof. the numeral 7 indicates a section of a working barrel, the bore of which is enlarged at its lower end and is provided with internal threads 8 which engage threads formed on the upper end of a nipple 9. The lower end of the nipple 9 is provided with male threads which engage female threads formed in the enlarged bore in the upper end of a pipe 10, the lower end of which is internally threaded to receive the upper end of a pipe 12.

A plunger 13 is slidably fitted in the working barrel 7. The lower end of the plunger 13 is internally threaded to receive a valve seat 14 having valve ports 14ª separated by an apertured web 14ᵇ through which passes a piston rod or Garbutt rod 15 centrally situated within the plunger 13 and having an enlargement 16 at its upper end which is free.

Integral with the valve seat 14 is a tubular member 18 encircling with a working fit the piston rod 15. The member 18 is encircled by a valve 19 adapted to close the valve ports 14ª and to be moved therefrom. The member 18 extends above the valve 19, forming a section 20 having an enlarged bore 21 adapted to receive packing which is enclosed around the piston rod 15 by a packing gland 22 which is pressed down on the packing by a packing nut 23 which is provided with female threads engaging male threads formed on the upper end of the section 20. A coiled spring 24 encircles the section 20 and is held between the nut or cap 23 and the valve 19. The lower end of the tubular member 18 is provided with depending arcuate tongues 25 oppositely disposed to each other.

A tubular member 27 is fitted into the pipe 10 and is secured thereto at its lower end by male threads which engage female threads formed in the pipe 10. The upper end of the tubular member 27 threadedly engages a plate 28 provided with ports 29 separated by a web 30 provided with an aperture through which the piston rod 15 extends. The lower end of the piston rod 15 threadedly engages the upper end of a piston or standing valve 32 which is provided with arcuate apertures 33 adjacent the piston rod 15. The lower portion of the aperture through the tubular member 27 is enlarged at 35; and in this enlarged portion of the aperture of the tubular member 27 is positioned a valve seat 36 secured by depending members 37, the upper ends of which are secured to the shoulder formed in the member 18 by the enlargement of the bore at 35. The valve seat 36 is provided with a fibre washer 36ª. A bolt 38 having a head 39 passes through the valve seat 36 and through the washer 36ª, and is provided at its lower end with a nut 40.

In the operation of the mechanism shown, when the plunger is pushed downwardly, the Garbutt rod 15, by reason of the friction between it and the packing in the member 18, also descends until the piston 32 rests on its seat 36, the valve 19 opening as the plunger descends. As the plunger rises, the piston 32 also rises, thus allowing the oil or other liquid to rise into the chamber above the piston.

It will be readily appreciated that according to the construction shown, my improved pump is operable in opposition to gas pressure in the well which frequently has the effect of keeping the standing valve, usually employed, from being seated and thus prevents the functioning of the pump.

When it is desired to withdraw the tubular member 27 and the standing valve 32 from the well, the plunger is lowered until the tongues or lugs 25 engage the apertures 29 in the plate 28, and the plunger is then rotated to unscrew the tubular member 27 from the pipe 10. The sucker rods are then pulled up by which action the standing valve 32 and the tubular member 27 together with the valve seat 36 attached to it are pulled up out of the well.

This invention has been described, but modifications thereof may be devised without departing from the spirit thereof, and it is to be understood that such modifications come within the scope of this invention.

What is claimed is:

1. In a pump, a pipe, a tubular member fitted into said pipe and threadedly engaging the same, an apertured web at the upper end of said tubular member, said tubular member having its lower portion enlarged interiorly, a standing valve seat positioned in the enlarged portion and of smaller diameter than the enlarged portion and securely held against substantial displacement by gas pressure, and a standing valve adapted to work in said tubular member, said valve having apertures at its upper end.

2. In a pump, a pipe, a tubular member fitted into said pipe and disengageably secured to the same, said tubular member having its lower portion enlarged interiorly, a standing valve seat positioned in the enlarged portion and securely held against excessive displacement, a standing valve adapted to work in said tubular member, said valve having apertures at its upper end, and a rod secured to said valve.

3. In a pump, a pipe, a tubular member fitted into said pipe and threadedly engaging the same, an apertured web at the upper end of said tubular member, said tubular member having its lower portion enlarged interiorly, a standing valve seat positioned in the enlarged portion and of smaller diameter than the enlarged portion and securely held against substantial displacement by gas pressure, a standing valve adapted to work in said tubular member, said valve having apertures at its upper end, a rod secured to said valve, said rod being adapted to work through said web in the upper end of said tubular member, a plunger encircling said rod, and means in said plunger for disengaging said tubular member from said pipe.

4. In a pump, a pipe, a tubular member fitted into said pipe and threadedly engaging the same, an apertured web secured to the upper end of said tubular member, said tubular member having its lower portion enlarged interiorly, a standing valve seat positioned in the enlarged portion and of smaller diameter than the enlarged portion and securely held against excessive displacement, a standing valve adapted to work in said tubular member, said valve having apertures at its upper end, a rod secured to said valve, said rod being adapted to work through said web in the upper end of said tubular member, a plunger encircling said rod and tongues formed on the lower end of said plunger to engage apertures in said web, whereby said tubular member may be disengaged from said pipe.

5. A standing valve for plunger pumps comprising a tubular member having a cylindrical bore therethrough, a tubular closure member slidable within said bore, and means providing a seat against which the lower edges of the closure member may seat, whereby the bottom of the closure member may be closed.

6. A standing valve for pumps having plungers comprising a tubular member having a cylindrical bore therethrough, a tubular closure member slidable within said bore, means providing a seat against which the lower edges of the closure member may seat, whereby the bottom of the closure member may be closed, and means adapted to connect the closure member to the plunger of the pump whereby the closure member may be forcibly seated and unseated upon reciprocation of the plunger.

7. A standing valve for pumps having plungers comprising a tubular member having a cylindrical bore formed in its upper end and an enlarged chamber in its lower end communicating with the bore, a tubular closure member slidable in said bore, means providing a seat in said chamber below the lower end of said bore upon which the lower edges of the closure member are adapted to seat so as to close its lower end, and means adapted to connect said closure member to the plunger of the pump, so that it may be forcibly seated and unseated upon reciprocation of the plunger.

8. A standing valve for plunger pumps comprising a tubular member having a cylindrical bore formed in its upper end and an enlarged chamber formed in its lower end communicating with said bore, a tubular closure member reciprocable in said bore, means forming a seat in said chamber below said bore upon which the lower edges of said closure member may seat to close its lower end, spiders mounted upon the upper ends of said closure member and tubular member, and a rod secured to the spider on the closure member and slidably extending through the spider on the tubular member, said rod being adapted to have a slidable but friction connection with the plunger of a pump so that the closure member may be forcibly seated and unseated thereby.

In testimony whereof I have signed my name to this specification.

JOHN A. DYSON.